United States Patent [19]
Rinkewich

[11] Patent Number: 4,629,129
[45] Date of Patent: Dec. 16, 1986

[54] MOBILE WATER IRRIGATION APPARATUS

[76] Inventor: Isaac Rinkewich, 12 Fishman Maimon Street, Tel-Aviv, Israel

[21] Appl. No.: 654,847

[22] Filed: Sep. 26, 1984

[30] Foreign Application Priority Data

Aug. 7, 1984 [IL] Israel .................................. 72605

[51] Int. Cl.$^4$ .............................................. B05B 3/12
[52] U.S. Cl. ................................... 239/733; 192/48.8
[58] Field of Search ................. 239/719, 720; 180/6.2, 180/6.7, 76; 192/48.8, 48.1, 67 R

[56] References Cited

U.S. PATENT DOCUMENTS

| | | | |
|---|---|---|---|
| 3,334,815 | 8/1967 | Hogg | 239/720 |
| 3,373,936 | 3/1968 | Purtell | 239/720 |
| 3,500,856 | 3/1970 | Boone et al. | 239/720 |
| 4,041,975 | 8/1977 | Ames | 239/720 |
| 4,358,055 | 11/1982 | Reinke | 239/720 |

Primary Examiner—Joseph F. Peters, Jr.
Assistant Examiner—Scott D. Malpede
Attorney, Agent, or Firm—Benjamin J. Barish

[57] ABSTRACT

Water irrigation apparatus comprises a water supply pipe divided into a plurality of sections each formed with a plurality of water outlets spaced along its length; pivotal connections connecting the ends of each section to the ends of the adjacent sections to form a line of sections articulated at their ends; a wheel carried by each section for propelling the respective section over the ground; and horizontal aligning means for each section effective to couple or decouple the wheel of each section to its respective section in response to the angle between it and the next adjacent section.

8 Claims, 12 Drawing Figures

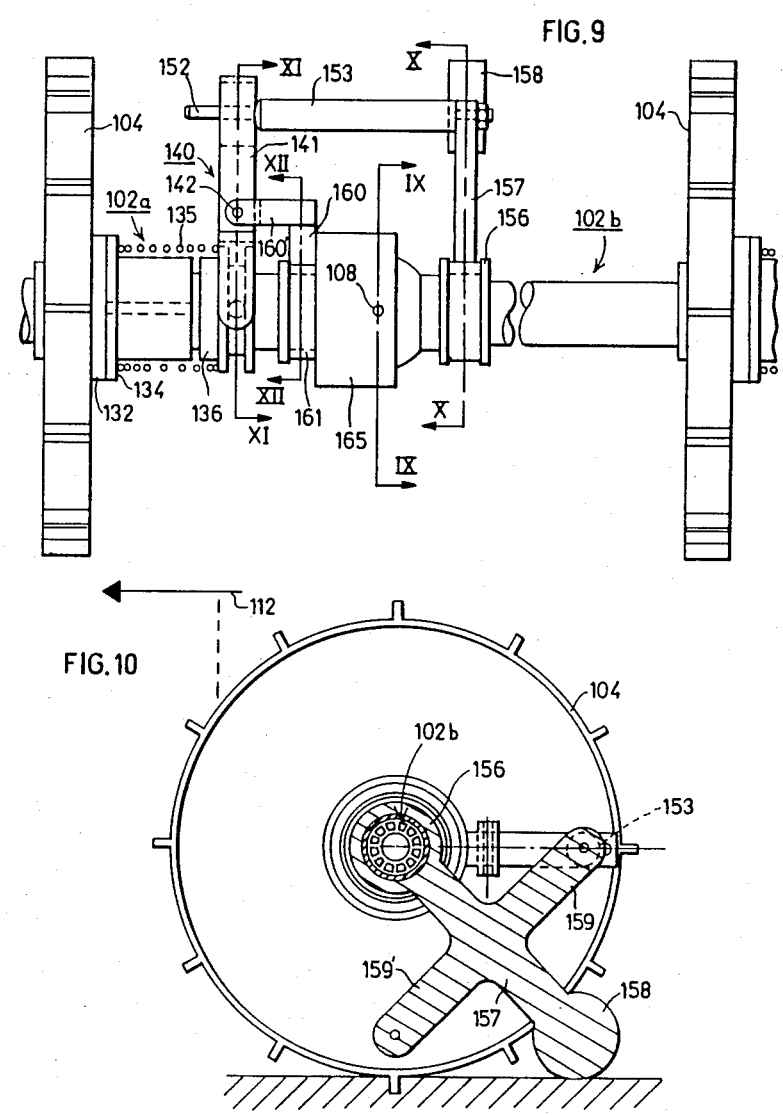

MOBILE WATER IRRIGATION APPARATUS

RELATED APPLICATIONS

The present application is related to copending applications Ser. No. 594,868, and also to application Ser. No. 654,816, filed the same day as this application.

BACKGROUND OF THE INVENTION

The present invention relates to water irrigation apparatus, and particularly to mobile systems which include means for propelling the apparatus over the ground to be irrigated.

A number of different types of mobile water irrigation systems are known, including the center-pivot, linear and side-roll systems. Such systems include a water supply pipe divided into a plurality of sections each formed with a plurality of water outlets spaced along its length, and propelling means, such as wheels, provided for each section for propelling the respective section over the ground. Such apparatus may include a number of water supply pipe sections, each supported by wheels or towers, and the length of each section between the wheels or towers is typically from 40 to 120 feet. Obviously, it would be desirable to include many such sections in one apparatus, so that larger areas of water could be irrigated during each pass of the apparatus.

An object of the present invention is to provide water irrigation apparatus of the foregoing type provided with means enabling a large number of such sections to be included, thereby enabling larger areas of the ground to be irrigated with each pass of the apparatus.

SUMMARY OF THE INVENTION

According to a broad aspect of the present invention, there is provided water irrigation apparatus comprising: a water supply pipe divided into a plurality of sections each formed with a plurality of water outlets spaced along its length; pivotal connections connecting the ends of each section to the ends of the adjacent sections to form a line of sections articulated at their ends; a wheel secured to each section for propelling the respective section over the ground; and horizontal aligning means for each section effective to actuate or deactuate the propelling means of the respective section in response to the angle between it and the next adjacent section. The horizontal aligning means for each section comprises a clutch normally coupling each wheel to its respective section but effective to decouple the wheel when the respective section is advanced ahead of the adjacent section.

Each of the clutches includes an actuator carried on the end of one section on one side of its pivotable connection with the next adjacent section, and engageable with a coupling-decoupling mechanism carried on the end of the adjacent section at the other side of the pivotable connection, and effective to be acutated by the actuator to couple or decouple the wheel of the adjacent section, with respect to its respective section. The actuator comprises an arm pivotably mounted on the end of the one section and including a ground-engaging member for orienting the arm in a horizontal position parallel to its respective section while the latter is propelled along the ground.

The water supply pipe sections in apparatus constructed in accordance with the foregoing features tends to maintain substantial horizontal alignment with each other, since whenever one section becomes ahead of the next adjacent one, its respective wheel is automatically decoupled and therefore ceases to advance its respective pipe section until the next adjacent one catches up and becomes horizontally aligned with it, whereupon the wheel is then automatically recoupled to its respective section so as to move it while in substantial horizontal alignment with the other sections.

Two embodiments of the invention are described below. In one embodiment, the clutch includes a toggle mechanism having two stable states, one effecting the coupling of the wheel to its respective section, and the other effecting the decoupling of the wheel from its respective section. In a second described embodiment, the clutch includes a pair of coupling members normally spring-urged to coupling engagement with each other, but actuated so as to decouple the two clutch members whenever one section is not in horizontal alignment with, but is advanced ahead of, its next adjacent section.

Further features and advantages of the invention will be apparent from the description below.

BRIEF DESCRIPTION OF THE DRAWINGS

The invention is herein described, by way of example only, with reference to the accompanying drawings, wherein:

FIG. 9 illustrates a second embodiment of the invention; and

FIGS. 10, 11 and 12 are sectional views along lines X—X, XI—XI, and XII—XII, respectively, of FIG. 9.

DESCRIPTION OF PREFERRED EMBODIMENTS

Figure 1:
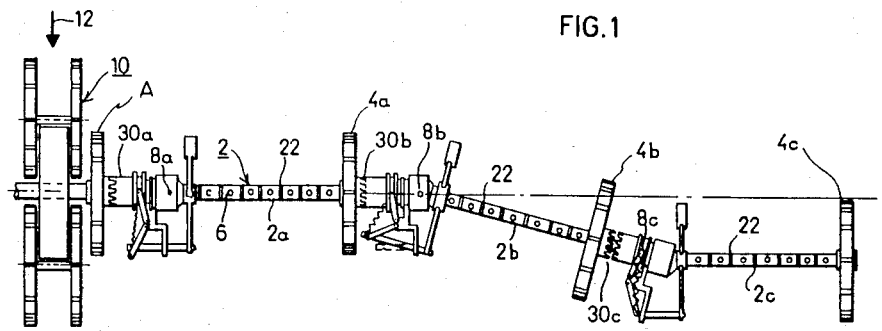
FIG. 1 schematically illustrates one form of water irrigation apparatus constructed in accordance with the present invention.

The apparatus illustrated in FIGS. 1-8 is a mobile irrigation system of the linear type, commonly called a side-roll system. It includes a continuous water supply pipe, generally designated 2, divided into a plurality of sections 2a, 2b, 2c, etc., each carrying a ground-engaging wheel 4a, 4b, 4c of larger diameter than the pipe section for propelling the pipe section over the ground. Each pipe section is formed with a plurality of water outlets 6 spaced along the length of the respective section for distributing the water over the ground. The pipe sections are pivotably connected to each other by connections sections 8a, 8b, 8c so that the sections are articulated at both ends as they advance over the ground. A drive 10, such as a tractor or the like, is provided at one end or in the middle and is coupled to the pipe sections to rotate them, and thereby their wheels, for propelling them over the ground. The apparatus is advanced in the direction of arrows 12, (FIG. 1) while water is supplied through the pipe sections 2a, 2b, 2c, the water being discharged through outlets 6 spaced along the length of the pipe sections so as to uniformly distribute water over the ground being traversed by the apparatus.

For purposes of example, the water supply pipe sections 2a, 2b, 2c are of the coaxial-tube construction described in co-pending patent application Ser. No. 594,868; this construction, as shown particularly in FIGS. 3-6, includes an inner tube 14 through which the water is supplied, an outer tube 16, and a plurality of radial ribs 18 dividing the space between the inner and outer tubes into a plurality of axially-extending compartments 20. One of these compartments receives water from the inner tube 14, via openings (not shown) in the inner tube; the outlets 6 (FIG. 1) for discharging the water to the ground are formed in the outer tube 16 in alignment with the water-filled compartment 20. In addition, the outer face of the outer tube 16 is formed with annular rings or ribs 22 which block the water discharged from the outlets 6 from flowing along the outer face of the outer tube, and thereby cause the water to fall by gravity on to the ground during the operation of the apparatus.

Further details in the construction and operation of such irrigation systems, particularly the advantages in using the illustrated coaxial-tube construction for the water supply pipe 2, are described in copending patent applicaton Ser. No. 594,868, and an arrangement for providing the outlets with deflectors for efficiently distributing the water is described in copending patent application Ser. No. 654,846.

According to the present invention, the illustrated apparatus includes horizontal aligning means for each section effective to actuate the propelling wheels 4a, 4b, 4c of the respective sections so as to propel each with the next adjacent section when the respective section is in horizontal alignment therewith, but not to propel the section when it is advanced ahead of the next adjacent section. In the embodiment illustrated in FIG. 1, the horizontal aligning means comprises a clutch for each section, generally designated 30a, 30b, 30c, respectively, which clutch is selectively actuated to couple or decouple its respective section to the next adjacent one.

Thus, as shown in FIG. 1, pipe section 2c is shown as advanced ahead of the other two sections 2a, 2b, and therefore its clutch 30c is shown as decoupling section 2c from secton 2b. Accordingly, the propelling wheel 4c of section 2c will not be rotated, until sections 2a and 2b have advanced so as to come into alignment with section 2c, whereupon clutch 30c will be restored to its normal condition coupling section 2c with its next adjacent section 2b, whereupon all three sections will now advance in substantial horizontal alignment.

The clutch construction for effecting this coupling and decoupling of the sections is more particularly illustrated in FIGS. 2-6. For purposes of example, the clutch illustrated in these figures is clutch 30b of FIG. 1, shown as coupling pipe section 2a to pipe section 2b via pivotal connection 8b.

Figure 2:
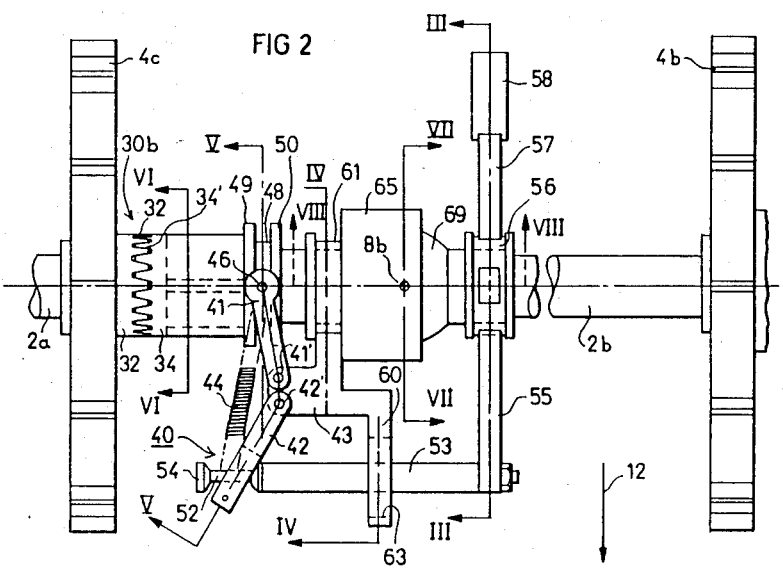
FIG. 2 is an enlarged view illustrating one section in the apparatus of FIG. 1.

As shown particularly in FIG. 2, clutch 30b comprises a first clutch member 32 having axially extending teeth 32' which, when the clutch is in its coupling condition, mesh with similar teeth 34' formed on a second clutch member 34. The latter member is in the form of a sleeve formed with splines 36 (FIG. 6) engageable with a splined sleeve 38 fixed to the outer tube 16 of the coaxial water supply pipe section 2a, so that sleeve 34 is axially movable with respect to sleeve 38 of pipe section 2a but is coupled for rotation with sleeve 38.

Sleeve 34 is axially movable on its respective pipe section 2a by a toggle mechanism, generally designated 40 (FIG. 2), having two stable states. In one stable state, (that illustrated in FIG. 2), the toggle mechanism moves sleeve 34 such that its teeth 34' engage teeth 32' of sleeve 32, fixed to the preceding pipe section 2a; and in a second stable state, (that illustrated by clutch 30c in FIG. 1), the toggle mechanism moves its respective sleeve 40 (rightwardly in FIGS. 1 and 2) so as to decouple sleeve 34 from sleeve 32.

Toggle mechanism 40 includes a pair of links 41, 42 pivotably mounted at their inner ends by pins 41', 42', respectively, to a plate 43, the outer end of the two links being connected together by an over-center spring 44, 45, each of on the opposite sides of the toggle mechanism. The outer ends of link 41 straddle the opposite sides of sleeve 34 and include a pair of projections 46, 47 (FIG. 5) receivable within an annular recess 48 defined by a pair of annular ribs 49, 50 (FIG. 2) formed in the outer face of sleeve 34.

The outer end of link 42 is formed with an elongated slot 51 (FIG. 5) receiving a pin 52 fixed to the end of a push-rod 53, the outer end of pin 52 being formed with an enlarged head 54. The opposite end of push-rod 53 is fixed to a horizontal arm 55 carried by a sleeve 56 pivotably mounted to the outer end of pipe section 2b (FIG. 3), which sleeve carries a further arm 57 terminating at its outer end in a ground-engaging rounded head 58.

Arm 57 is at an angle of about 135° with respect to arm 55, so that as the respective pipe section 2a advances by a rotation of the wheels (e.g. 4a), head 58 engages the ground and maintains arm 55 in a substantially horizontal position, which arm in turn maintains push-rod 53 in a substantially horizontal position. This is the arrangement when the wheels are advancing in the direction of arrow 12 in FIG. 3, namely from right to left; in this case the ground engaging head 58 is located on the right side of wheel 4, i.e., on the trailing side. However, if the wheel advance the pipe section in the opposite direction, i.e. from left to right, arm 57 would be manually rotated to bring its ground-engaging head 58 to the left side of the wheel, i.e., the trailing side, whereupon arm 59 would then be maintained in a substantial horizontal position, and would be fixed to push-rod 53 so as to maintain that rod in a substantial horizontal position.

Plate 43, to which the inner ends of the toggle links 41, 42 are pivoted, is carried by an arm 60 secured to a sleeve 61 rotatably mounted on another sleeve 62 (FIG. 4) received over pipe section 2a. The other end of arm 60 is formed with an elongated slot 63 receiving push-rod 53. Both arm 60 and push-rod 53 are thus maintained in a horizontal position during the rotation of pipe section 2a.

Figure 8:
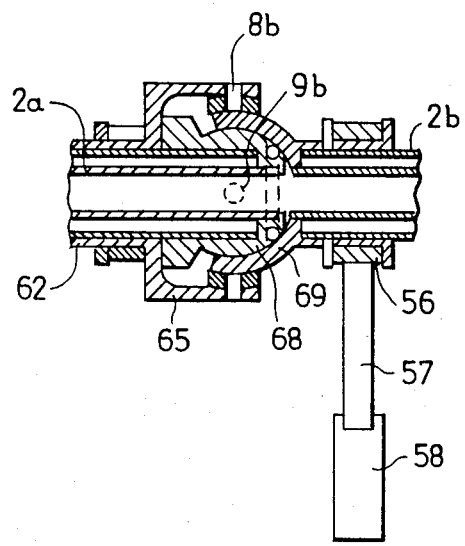
Figure 11:
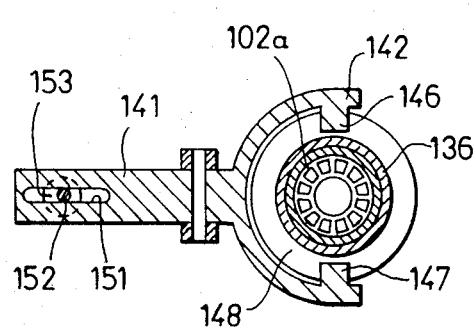
Figure 12:
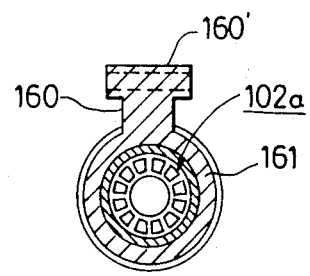

As shown in FIG. 8, sleeve 62 is integrally formed with a sleeve 65 of larger diameter and housing a universal joint permitting pipe section 2a to be pivoted with respect to the adjacent section 2b about two perpendicular axes as defined by pin 8b and another 9b. For this purpose, pipe section 2a is provided with a spherical end 68 receivable within a spherical cavity 69 fixed to the adjacent pipe section 2b to provide a universal joint of the ball-and-socket type.

Figure 3:
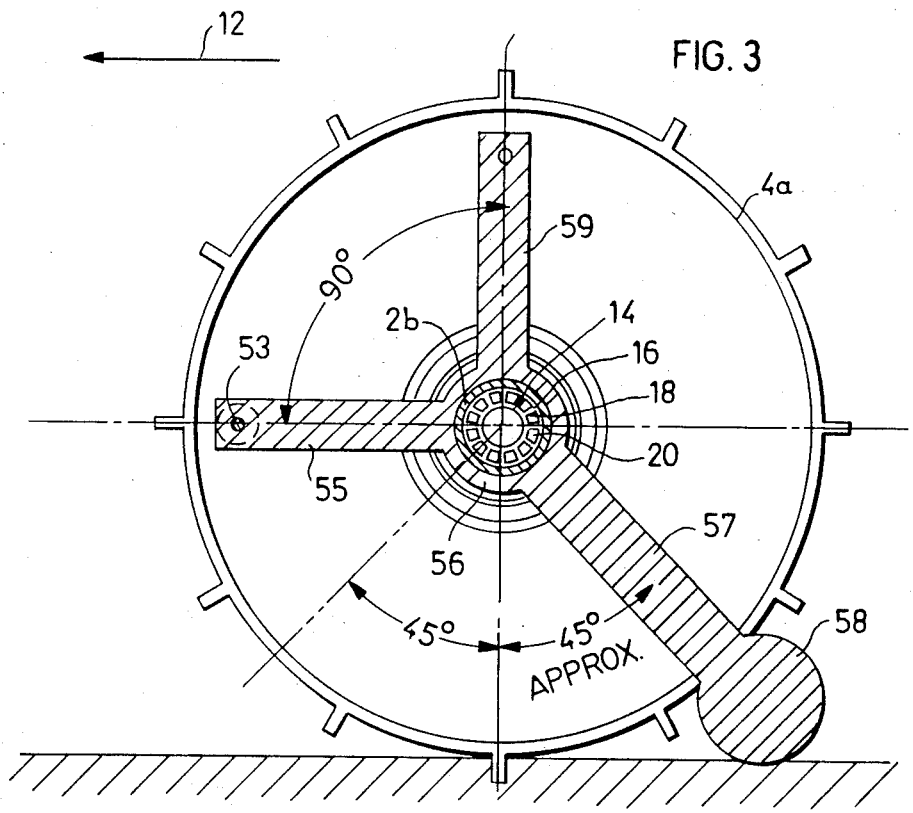
FIGS. 3-8 are sectional views along lines III—III, IV—IV, V—V, VI—VI, VII—VII and VIII—VIII, respectively, of FIG. 2.
Figures 4, 5, 6:
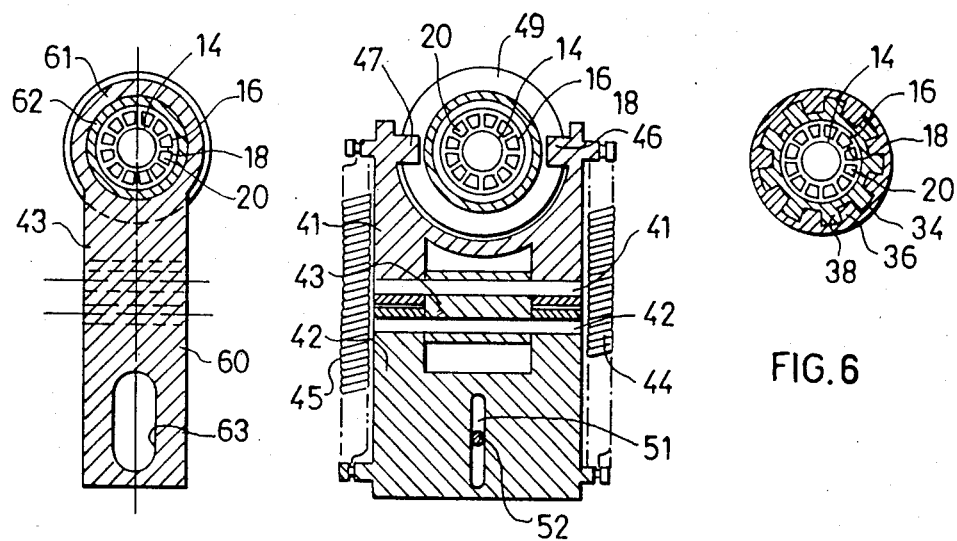
Figure 7:
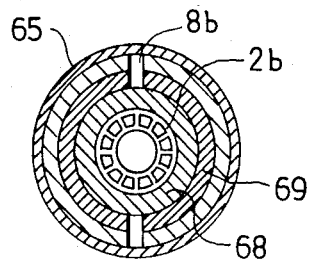

The apparatus illustrated in FIGS. 1-8 operate as follows:

An internal combustion engine or other drive (not shown) at one end or in the middle of the apparatus rotates the water supply pipe section 2a, 2b, 2c—which sections, being coupled to their respective wheels 4a, 4b, 4c—are advanced in a line in the direction of arrow 12 in FIGS. 1 and 3. Each section is pivotable to its adjacent section along the two axes (e.g., 8b, 9b FIG. 8) so as to accommodate changes in the ground contour, etc. So long as the sections are in substantial horizontal alignment with each other, their toggle mechanisms 40 are as illustrated in FIG. 2 wherein their clutches 30a, 30b, 30c, are in coupling condition, thereby transmitting the rotary movement of each pipe section to their respective wheels 4a, 4b, 4c.

However, should one pipe section advance ahead of the next one, its toggle mechanism is actuated so as to decouple its clutch from the preceding one. This is illustrated by pipe section 2c in FIG. 1, wherein its clutch 30c has decoupled that section from the preceding section 2b. Toggle mechanism 40 for section 2c has been actuated to this clutch-decoupling condition by push-rod 53 (FIG. 2) which, while being maintained in horizontal position by the ground-engaging member 58 (FIG. 3), has moved rightwardly because of the pivoting of section 2c about pivot point 8c (FIG. 1), which thereby has moved the end of its toggle link 42 (FIG. 2) rightwardly past its pivotal connection to member 43, which caused the end of toggle link 41 also to move rightwardly to move teeth 34' of sleeve 34 away from teeth 32' of sleeve 32.

When clutch member 34 for pipe section 2c is thus decoupled from clutch member 32, as shown in FIG. 1, pipe section 2c does not transmit its rotary movement to its wheel 4c, and therefore this pipe section will not advance (in the direction of arrow 12), but rather will remain in place until the other two pipe sections 2a and 2b become horizontally aligned with pipe section 2c. When this occurs push-rod 53 of pipe section 2c actuates its toggle mechanism 40 back to the position illustrated in FIG. 2, causing sleeve 34 to move its teeth 34' back into coupling engagement with teeth 32' of sleeve 32, thereby re-coupling wheel 4c to its pipe section 2c, and causing pipe section 2c to move with pipe section 2b.

If the apparatus is to travel in the reverse direction, i.e. opposite to the direction of arrow 12 in FIGS. 1 and 3, arm 57 of each section would be rotated to the trailing side of its wheel 4, whereupon arm 59 would now be in the horizontal position and would receive the push-rod 53 for actuating its toggle mechanism 40.

FIGS. 9-12 illustrate another embodiment of the invention, also including a plurality of water pipe sections (two being shown at 102a, 102b) secured to wheels 104 for rotating the sections, each section being pivoted to the next adjacent section by a similar universal joint as indicated by pin 108 in FIG. 9. The arrangement of FIGS. 9-12, however, utilizes a different type of clutch mechanism and a different type of clutch actuator from the arrangement illustrated in FIGS. 1-8.

Thus, the clutch mechanism in the arrangement of FIGS. 9-12, includes two friction clutch members 132, 134, which are normally urged into the illustrated coupling engagement by a coil spring 135 interposed between clutch member 134 and a sleeve 136 received over pipe section 102a. A clutch actuator mechanism, generally designated 140 (FIG. 9), normally retains sleeve 136 in the illustrated position wherein it acts, via spring 135, to couple clutch member 134 to clutch member 132. However, when pipe section 102b to the right of pivot 108 is pivoted in the counter-clockwise direction in FIG. 9 (which occurs when section 102b is advanced with respect to section 102a on the left side of pivot 108), clutch actuator 140 moves sleeve 136 rightwardly, thereby decoupling clutch member 134 from clutch member 132.

More particularly, each clutch actuator mechanism 140 comprises a lever arm 141 terminating in a semi-circular yoke 142 (FIG. 11) formed with a pair of projections 146, 147 received within an annular recess 148 formed in sleeve 136 of pipe section 102a at one side of pivot 108. The opposite end of lever arm 141 is formed with an elongated opening 151 receiving a pin 152 carried at the end of a push-rod 153. A sleeve 156 is rotatably received over pipe section 102b at the opposite side of pivot 108, which latter sleeve is secured to an arm 157 terminating at its outer end in a rounded ground-engaging member 158.

Arm 157 is formed with two right-angle extensions 159, 159', as shown in FIG. 10. FIG. 10 also indicates by arrow 112, the direction of advance of the apparatus, the ground-engaging member 158 always being located at the trailing side of wheel 104 of the respective section. Thus, when the apparatus is advanced in the direction of arrow 112, arm extension 159 would receive push-rod 153 to maintain it in horizontal position; but if the direction of advance is reversed, arm 157 should be rotated to bring the ground-engaging member 158 to the opposite side of its wheel, which would then be the trailing side, whereupon arm extension 159' would receive push rod 153 and maintain it in the horizontal position.

Lever arm 141 engageable by the end of push rod 153 is pivotally mounted, at an intermediate point 142, to an axial extension 160' of an arm 160 rotatably mounted on an extension 161 of a sleeve 165 forming the housing for the universal joint between the two pivoted sections 102a, 102b.

The apparatus illustrated in FIGS. 9-12 operates in substantially the same way as described above with respect to FIGS. 1-8, except for the manner in which the clutch members 132, 134 are decoupled in the event of horizontal misalignment of the pipe sections on opposite sides of the pivot 108. Thus, so long as the two pipe sections 102a, 102b on opposite sides of pivot 108 are in substantial horizontal alignment, lever arm 141 is in the position illustrated in FIG. 9 wherein it retains sleeve 136 in position to cause spring 135 to press clutch member 134 against clutch member 132. However, should pipe section 102b to the right of pivot 108 pivot in the counter-clockwise direction, as would occur when pipe section 102b advances ahead of its preceding section 102a, push-rod 153 pivots lever arm 141 counter-clockwise about pivot 142, moving sleeve 136 rightwardly away from spring 135, whereupon the spring ceases to press clutch member 134 into engagement with clutch member 132, thereby decoupling the wheel from the respective pipe section.

While the invention has been described with respect to two preferred embodiments, it will be appreciated that many other variations, modifications, and applications of the invention may be made.

What is claimed is:

1. Water irrigation apparatus comprising:
   a water supply pipe divided into a plurality of sections each formed with a plurality of water outlets spaced along its length;
   pivotal connections connecting the ends of each section to the ends of the adjacent sections to form a line of section articulated at their ends;
   a wheel secured to each section for propelling the respective section over the ground;
   and horizontal aligning means for each section effective to actuate or deactuate the propelling means of the respective section in response to the angle between it and the next adjacent section;

said horizontal aligning means for each section comprising a clutch normally coupling each wheel to its respective section but effective to decouple the wheel when the respective section is advanced ahead of said adjacent section;

each of said clutches including an actuator carried on the end of one section on one side of its pivotal connection with the next adjacent section, and engageable with a coupling-decoupling mechanism carried on the end of the adjacent section on the other side of said pivotal connection, and effective to be actuated by said actuator to couple or decouple the wheel of said to couple or decouple the wheel of said adjacent sections to its respective section: said actuator comprising an arm pivotably mounted on the end of said section and including a ground-engaging member for orienting said arm in a horizontal position and parallel to its respective section while the latter is propelled along the ground.

2. Apparatus accoding to claim 1, wherein said actuator further comprises a push-rod carried at the end of said arm opposite to its ground-engaging member.

3. Apparatus according to claim 1, wherein said coupling-decoupling mechanism of the clutch comprises an over-center spring toggle having a first stable state actuating the clutch to couple the wheel to its respective section, and a second stable state actuating the clutch to decouple the wheel from its respective section.

4. Apparatus according to claim 3, wherein said clutches include a pair of clutch members formed with teeth which are actuated by said toggles to mesh with each other when said toggle is in its first stable state, and to be spaced from each other when said toggle is in said second stable state.

5. Apparatus according to claim 1, wherein said coupling-decoupling mechanism comprises a lever arm pivotably mounted to the end of said adjacent section and normally occupying a first position coupling the wheel to its respective section, but pivotable by said actuator to a second position to decouple the wheel from its respective section.

6. Apparatus according to claim 5, wherein said clutch includes a pair of clutch members, a spring normally urging the clutch members into engagement with each other, and means for disabling said spring from urging their clutch members into engagement with each other when said lever arm is pivoted to said second position by said actuator.

7. Apparatus according to claim 1,
further including a sleeve between each clutch and its respective end of the water supply pipe section, which sleeve couples the latter to the clutch for rotation therewith, but permits axial movement of one with respect to the other.

8. Apparatus according to claim 1,
wherein said pivotal connections permit vertical flexibility of the plurality of sections.

* * * * *